Nov. 5, 1963    P. G. HANSEL    3,110,027
REFERENCE MODULATION PHASE STABILIZER
Filed Dec. 23, 1959    2 Sheets-Sheet 1
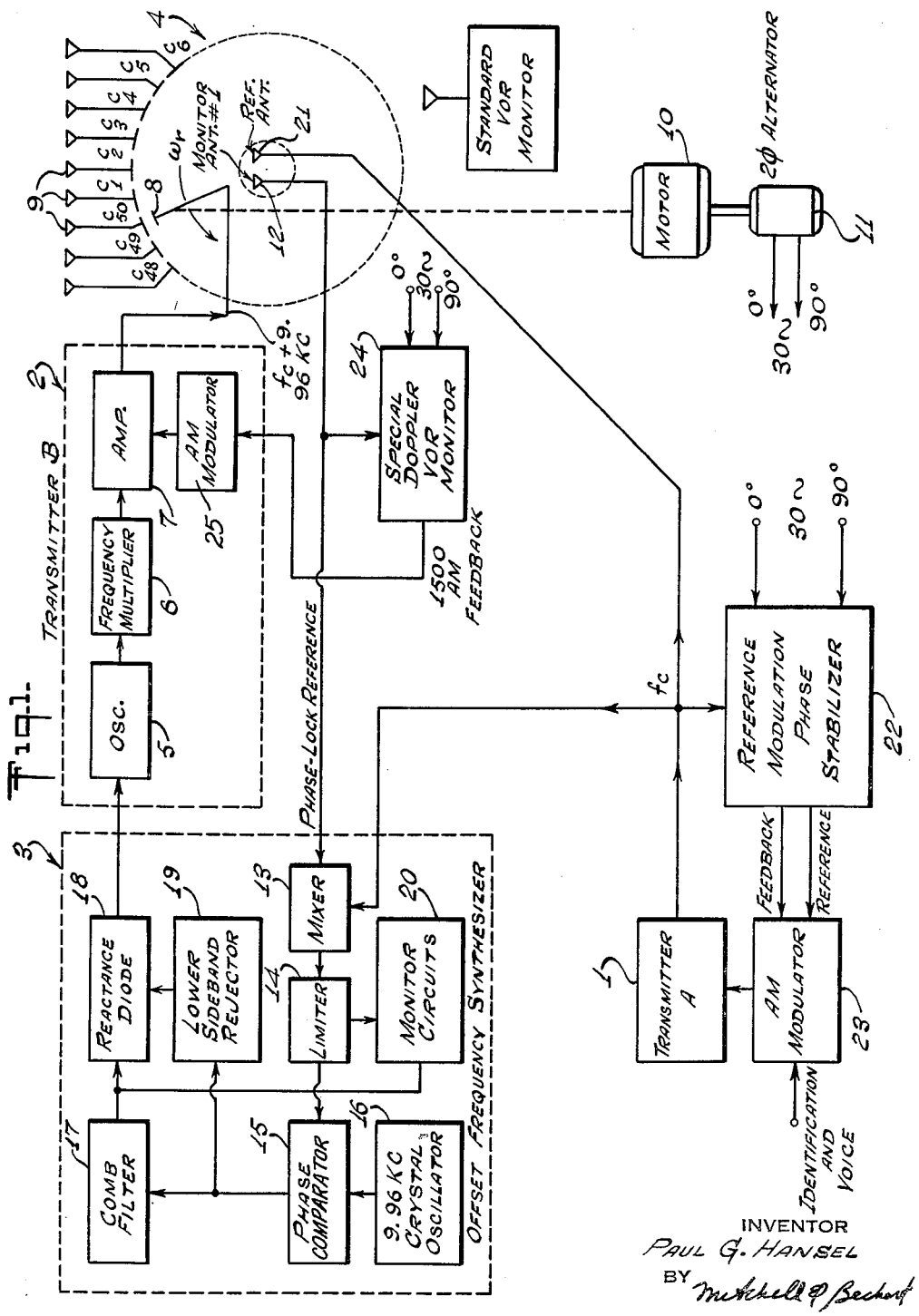
INVENTOR
PAUL G. HANSEL
BY Mitchell P Bechert
ATTORNEYS

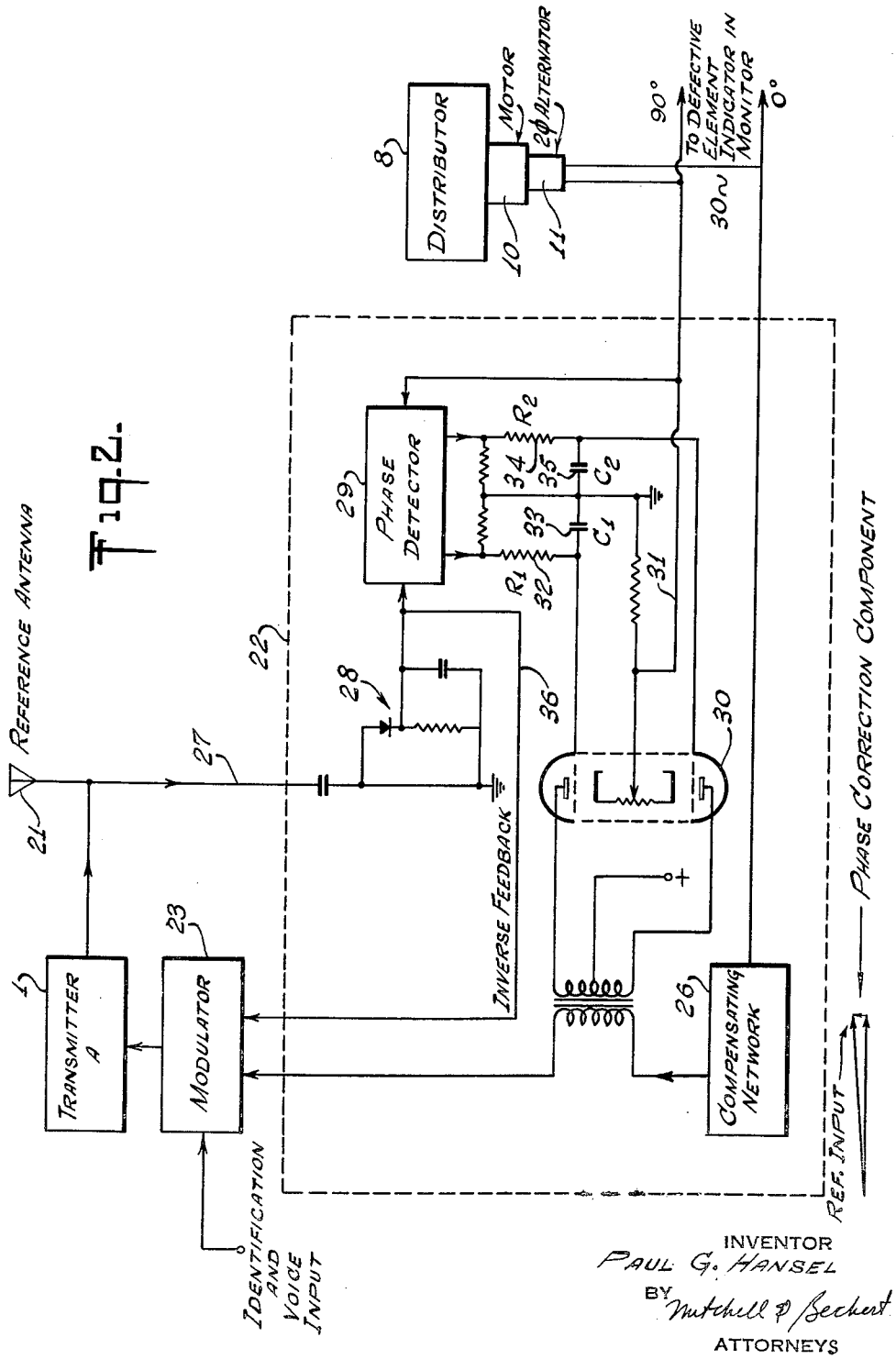

3,110,027
REFERENCE MODULATION PHASE STABILIZER

Paul G. Hansel, Greenvale, N.Y., assignor to Servo Corporation of America, Hicksville, N.Y., a corporation of New York
Filed Dec. 23, 1959, Ser. No. 861,552
7 Claims. (Cl. 343—106)

This invention relates to radio navigation systems and more particularly to fixed phase reference modulation radio beacon systems.

Some electronic information systems, such as Doppler omnirange navigation aids radiate a fixed phase reference modulation signal which requires a stable envelope phase. For example, in one type of omnirange system, a reference signal is generated at a given frequency and a comparison signal is generated at a constant frequency difference from the reference signal. The comparison signal is effectively rotated by successively coupling it through a commutator to a plurality of radiating elements, disposed in a ring about the reference signal radiator. A measurement at a remote location of the Doppler frequency of the effectively rotated signal relative to the reference signal provides an indication of the azimuth of the remote location relative to the signal sources.

In such systems, in order to assure course stability, it is essential that the reference signal modulation have a constant envelope phase relative to the effective rotation of the comparison signal, or in other words, the reference signal phase modulation must be stable relative to the commutator rotation.

In the past, goniometers have been utilized to obtain the stable envelope phase for the reference signal modulation but the goniometer has been found generally to be inefficient and expensive as well as difficult to adjust and maintain.

It has been found far simpler and more efficient to derive a signal from an alternator and amplitude modulate the reference signal to assure the required constant envelope phase. However, amplitude modulation with a signal derived from an alternator may result in phase instability due to the phase variations which may occur in the modulator or transmitter tuning.

One of the objects of this invention, therefore, is to obtain a constant envelope phase for a reference signal by direct modulation from an alternator.

Another object of this invention is to utilize signals obtained from the windings of an alternator to directly modulate the reference signal of a radio beacon.

A further object of this invention is to provide in a radio navigation aid a stable envelope phase for a reference signal relative to the phase of rotation of a comparison signal.

A feature of this invention is to compare the phase of the output signal modulation envelope with the phase of the input modulation signal to derive a control signal proportional to the phase error and to obtain a quadrature phase component responsive to the control signal which is then utilized to correct the phase error.

Another feature of this invention is to utilize one of two phase signals obtained from an alternator driven by a motor shaft common to a commutator, to modulate a transmitter which has its output sampled and compared to the other signal obtained from the alternator, to derive an error signal which is fed back to correct the phase of the output of the transmitter.

The above mentioned and other objects and features of this invention will become more apparent by reference to the following description taken in conjunction with the accompanying drawing, in which:

FIG. 1 is a schematic drawing in block form, of a Doppler omnirange radio navigation beacon system utilizing the reference modulation phase stabilizer of the invention, and FIG. 2 is a schematic circuit diagram, partly in block form, of the reference modulation phase stabilizer of the invention.

Referring to FIG. 1 of the drawing, a Doppler omnirange radio navigation beacon system utilizing the reference modulation phase stabilizer of this invention, comprises a master signal source 1, transmitter "A," a slaved signal source 2, transmitter "B," a phase locked servo control loop 3 which adjusts the frequency of the output of signal source 2 to maintain a constant offset frequency or frequency difference in its output relative to the frequency of the output of signal source 1, and an antenna system 4 for radiating the output of the signal sources 1 and 2.

The signal source 2 includes an oscillator 5 which has its output coupled to a frequency multiplier 6. The output of the multiplier 6 is coupled through amplifier 7 to the commutator 8 of the antenna system 4. The commutator 8 couples the energy from signal source 2 to a plurality of radiating elements 9, disposed in a circle or ring about a central point. In order to couple energy to each of the radiating elements 9 in succession around the ring, the commutator 8 is mechanically rotated by a motor 10, which also drives an alternator 11. The radiation pattern of successively coupled radiating elements disposed in a ring closely simulates the pattern of a whirling antenna.

A monitor antenna 12 is disposed in the center of the ring or circle of radiating elements 9 and receives the signals emitted therefrom. The signals received by the monitor antenna 12 are coupled to the mixer circuit 13 in the phase locked servo control loop circuit 3. The other input to the mixer 13 is coupled from the signal source 1. The output of the mixer 13 is limited in circuit 14 and coupled as one input to the phase comparator 15. The other input to the phase comparator 15 is the ouput of a crystal controlled reference oscillator 16 which produces a signal having a frequency equal to the desired frequency separation between the reference signal from source 1 and the comparison signal from source 2.

The output of the phase comparator 15 is responsive to any difference in frequency or phase of the signals radiated from the antenna elements 9, the output of source 1 and the output of the crystal oscillator 16. The output of the phase comparator 15 is filtered in circuit 17 and utilized as an input to a reactance device such as a diode 18. In accordance with well known engineering principles, the output of the reactance device 18 is coupled to the oscillator 5 of the signal source 2 to adjust the frequency of its output. In order to assure that the oscillator 5 will operate at the proper frequency sideband, a lower sideband rejection circuit 19 is provided. Monitor circuits 20 in the phase locked servo control loop 3 provide an indication of the malfunctioning of components in the system.

The master signal source 1, transmitter "A," has its output coupled to a reference antenna 21 also located centrally of the antenna ring.

The signals received by the monitor antenna 12 are also coupled to a special Doppler omnirange monitor circuit 24 where the extraneous and objectionable amplitude modulation of the signals radiated by the ring of elements 9 are detected and coupled as inverse feedback to the amplitude modulator circuit 25 in the signal source 2. The output of the modulator 25 is coupled to the amplifier 7 to compensate and thus eliminate the objectionable amplitude modulation from the output of the commutated elements 9.

In order to phase stabilize the reference signal output from the signal source 1, a reference modulation phase stabilizer 22 is provided having as one input, the signal from the source 1 and as the other input a pair of signals, derived from alternator 11, ninety degrees out of phase and having a frequency equal to the rate of rotation of the commutator 8. This pair of signals is obtained from the alternator 11 which is driven by the shaft of motor 10 common to the commutator 8. The stabilizer circuit 22 has its output coupled through the modulator 23 to the signal source 1. The modulator 23 may also be used to impress voice or other information bearing signals as a modulation of the reference signal radiated from the reference antenna 21.

Referring to FIG. 2 of the drawing, a schematic circuit drawing, partly in block form, of the reference modulation phase stabilizer in accordance with the principles of this invention comprises means to couple a two phase signal from the alternator 11. The two phase signal has a frequency equal to the scanning rate of the commutator or distributor 8 which couples the signals from source 2 to the radiating elements 9. Driving the alternator 11 from a motor shaft which is common to the distributor 8 insures frequency stability. In order to permit initial phasing of the alternator 11 relative to the distributor 8 the outer shell of the alternator 11 may be equipped with a micrometer adjustment. The two signals obtained from the alternator are ninety degrees out of phase, i.e., at zero degrees and ninety degrees.

The zero degree signal from the alternator 11 is applied to the modulator 23 through a compensating network 26 which may consist of a simple lead network. The compensating network 26 compensates for the normal phase delay which occurs under conditions of proper adjustment in coupling the signal to the input of modulator 23 and the envelope modulation at the antenna 21. The output of the compensating network modulates the signal source 1.

The output of the transmitter "A," a signal source 1, has a portion coupled over line 27 and demodulated by circuit 28 in order to recover the scanning frequency modulation signal. The recovered scanning frequency modulation signal is coupled as one input to the phase detector 29. The other input to phase detector 29 consists of the ninety degree phase signal from the alternator 11. The phase of the ninety degree signal and the demodulated scanning frequency modulation signal are compared in the detector 29. When the modulation envelope of the radiated signal coupled to antenna 21 is of the correct phase, the output of the detector 29 will be zero. If a phase error occurs in the modulation envelope of the output signal of source 1, a D.C. signal appears at the output of the phase detector 29. The output signal of the phase detector 29 has an amplitude and polarity proportional to the phase error in the output of signal source 1. The error signal output of the phase detector 29 is applied to the grids of the double triode balanced modulator 30 which has in phase cathode excitation obtained from the ninety degree signal from the alternator 11, coupled over line 31. Thus, the output from the balanced modulator 30 is zero when there is zero phase error in the output of signal source 1 and has an output proportional in both amplitude and phase to the phase error in the output of source 1, if there is any error present. The output of the balanced modulator 30 is, therefore, a small phase-correcting quadrature component which is applied to the modulator 23 in series with the large amplitude compensated zero degree signal from the compensating network 26. In practice the loop gain may be adjusted to reduce a phase error by a factor of fifty or more. Due to the high loop gain, extremely severe phase shifts occurring either in the modulator 23 or signal source 1 have an insignificant effect upon the envelope phase of the radiated reference modulation. The time constant determined by the combination of resistance 32, capacitor 33 and resistance 34, capacitor 35 is made long because it is desired to correct only slowly changing phase errors. In addition, this long time constant characteristic gives the control loop a low-pass characteristic which avoids phase perturbations due to voice or information signals coupled to the modulator 23.

A portion of the detected envelope modulation is coupled over line 36 as inverse feedback to the modulator 23 in order to reduce distortion and to stabilize modulation percentage. This contributes to overall accuracy and system stability.

Thus, it is apparent that the phase of the ouput modulation envelope is compared to the phase of the input modulation signal to develop a control signal proportional to the phase error. A quadrature phase component is then derived in a closed loop control system which is used to correct any phase errors in the output modulation envelope.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. Phase stabilizing means to control the phase of the envelope modulation of output signals comprising means to detect the envelope modulation of said output signals, a source of modulating signals, means to compare the phase of said detected envelope signals and said modulating signals, means responsive to said phase comparison to develop a control signal, means responsive to said control signal to develop a quadrature phase component signal and means to modulate said output signals responsive to said modulating signals and said quadrature phase component signal.

2. A phase stabilizer for the modulation envelope of an output signal comprising a source of signals, means to modulate said signals, a source of first and second phase reference signals ninety degrees out of phase, means to couple said first reference signal to said modulation means, means to detect the envelope modulation of said modulated signals, means to compare the phase of the detected envelope modulation with the second of said reference signals, means responsive to said phase comparison to produce an error signal having an amplitude and polarity indicative of the output of said phase comparison means, and means to couple said error signal to said modulator means in series with said first reference signal.

3. A phase stabilizer according to claim 2 wherein said means coupling said first reference signal to said modulator means includes a phase lead compensating network.

4. A phase stabilizer according to claim 2 wherein said means to produce an error signal includes a double triode balanced modulator and means coupling said second reference signal to the cathode of said double triode.

5. A phase stabilizer according to claim 2 which further includes means coupling a portion of said detected envelope modulation signal to said modulator means as inverse feedback.

6. A phase stabilizer according to claim 2 wherein the output of said phase comparison means includes a pair of load circuits having a relatively long time constant.

7. In a radio navigation beacon system including a plurality of successively commutated radiating elements and motor means to drive the commutating elements, means to stabilize the phase of the envelope modulation of the reference signals radiated from a central antenna including an alternator driven from said motor means, means to obtain a first and second reference signal ninety degrees out of phase from said alternator, means to modulate the signals coupled to said central antenna responsive to said first reference signal, means to detect the envelope modulation of the signals radiated from said central antenna, means to detect the phase of said envelope modulation, means to compare the phase of said detected envelope modulation with the phase of said second reference signal, means responsive to said phase comparison to provide an error signal and means coupling said error signal to said modulator means in series with said first reference signal.

References Cited in the file of this patent

UNITED STATES PATENTS

| | | |
|---|---|---|
| 2,298,930 | Decino | Oct. 13, 1942 |
| 2,427,366 | Mozley et al. | Sept. 16, 1947 |
| 2,618,701 | Christensen | Nov. 18, 1952 |
| 2,764,738 | Bush | Sept. 25, 1956 |
| 2,861,177 | Dishal et al. | Nov. 18, 1958 |
| 2,952,016 | Le Grand et al. | Sept. 6, 1960 |